Aug. 25, 1970    H. J. MADLER ET AL    3,525,534
VEHICLE FRAME

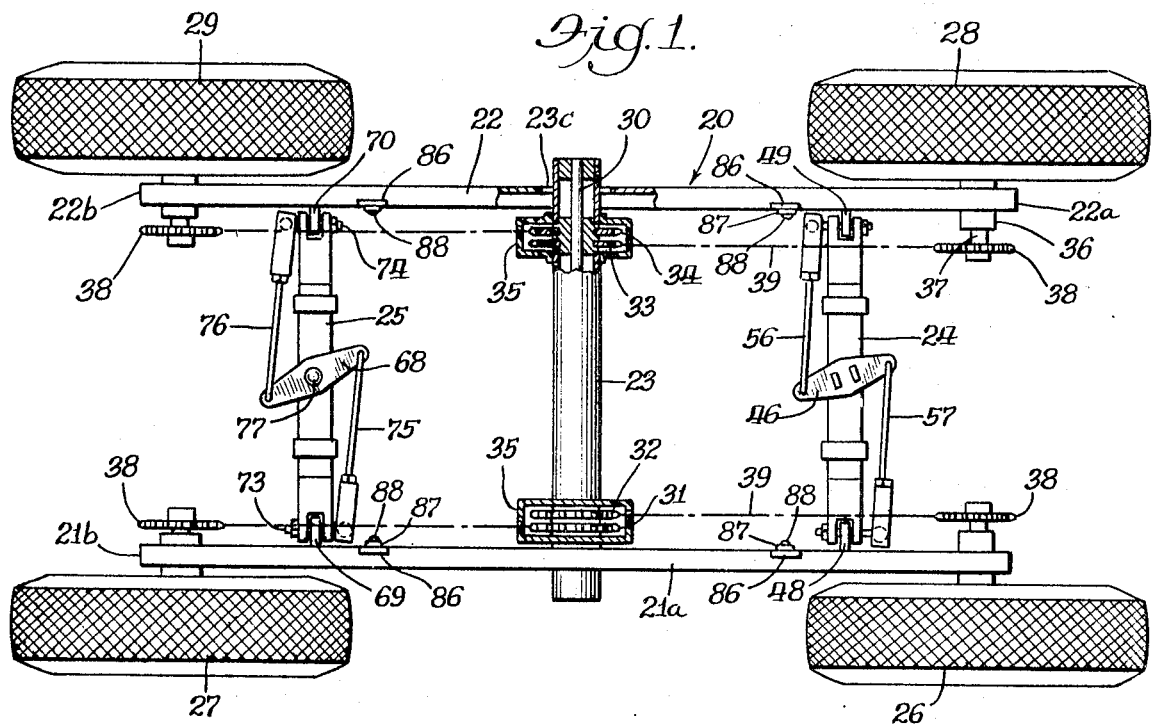
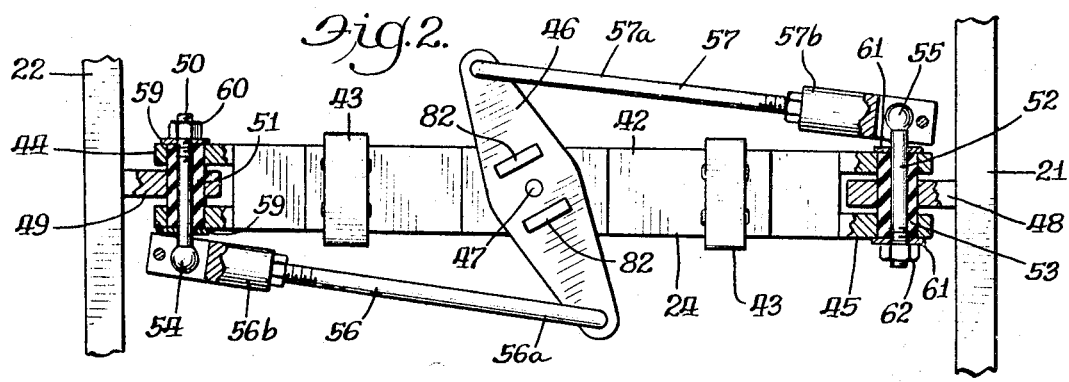
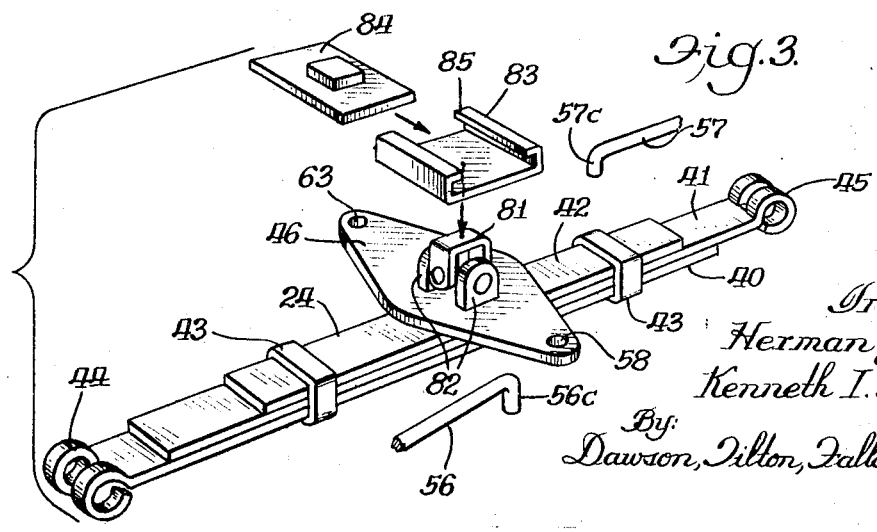

Filed Nov. 12, 1968    3 Sheets-Sheet 2

Inventors:
Herman J. Madler
Kenneth I. Doane, Sr.
By Dawson, Tilton, Fallon & Lungmus
Attys.

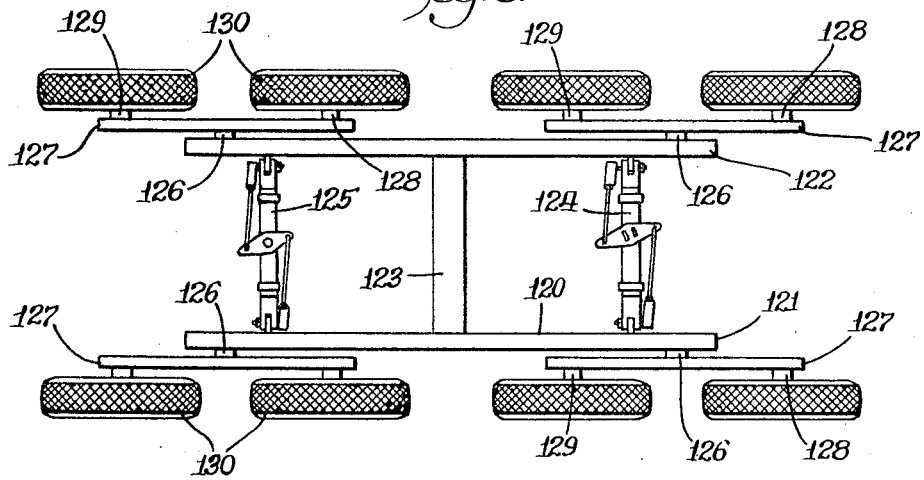
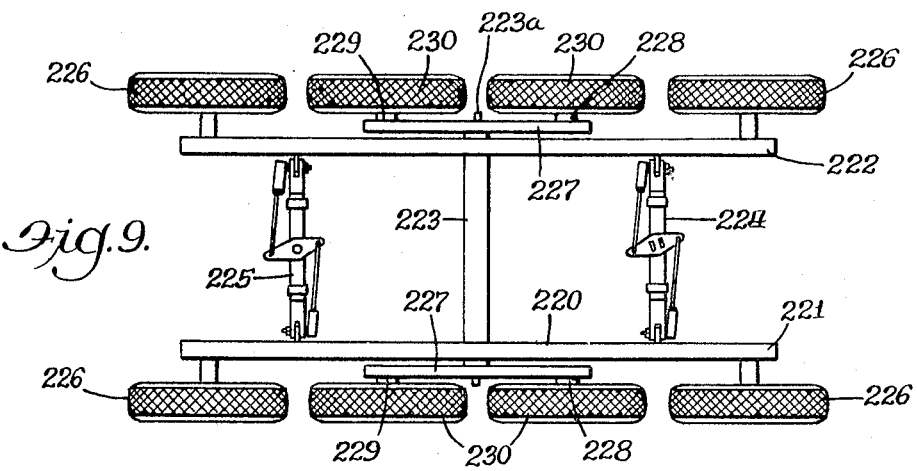
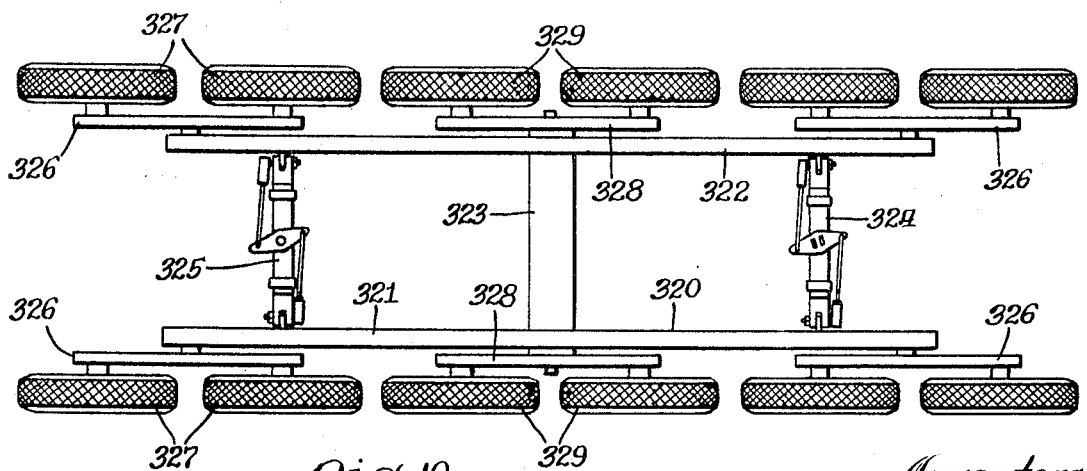

United States Patent Office 3,525,534
Patented Aug. 25, 1970

3,525,534
VEHICLE FRAME
Herman J. Madler, 2938 S. Cicero Ave., and Kenneth I. Doane, Sr., 2812 S. Cicero Ave., both of Cicero, Ill. 60650
Continuation-in-part of application Ser. No. 766,511, Oct. 10, 1968. This application Nov. 12, 1968, Ser. No. 775,009
The portion of the term of the patent subsequent to Apr. 14, 1987, has been disclaimed
Int. Cl. B60g 19/02
U.S. Cl. 280—104                                                 7 Claims

ABSTRACT OF THE DISCLOSURE

A vehicle frame and means for connecting the frame to a vehicle body. The frame includes a pair of spaced-apart frame arms which are joined by a central axle for independant rotation thereabout. The frame arms are joined adjacent their forward and rearward ends, respectively, by forward and rearward extendible connecting arms which permit the distance between the frame arms to increase as one frame arm rotates with respect to the other. Universal joint means are carried by each of the connecting arms and are adapted to connect the frame to a vehicle body, and centering means maintain each of the universal joints centered between the frame arms. At least one wheel is carried by each of the forward and rearward ends of each of the frame arms, and the central axle may also carry one or more wheels.

RELATED APPLICATIONS

This application is a continuation-in-part of our co-pending application entitled Six-Wheeled Vehicle With Independent Wheel Suspension, executed Sept. 13, 1968, Ser. No. 766,511, filed Oct. 10, 1968.

BACKGROUND

This invention relates to a vehicle frame, and, more particularly, to a vehicle frame for adapting a vehicle to traverse uneven or rough terrain.

Many vehicles have been designed to operate off improved roadways or highways and on uneven or rough terrain. Some of the vehicles are of a four wheel construction and others are of a six or more wheeled construction. In the six-wheeled vehicle category, two basic vehicle designs have evolved. One is the one piece frame, single body type vehicle. The other is the split frame, split body type vehicle. Each type has inherent limitations which prevents it from providing good transportation over uneven or rough terrain.

The one piece frame, single body type vehicle has limited rough terrain utility because of the torsional stress which is transmitted between the frame and the attached body when the vehicle is operated over rough terrain. The limitations of the vehicle are especially noticeable when two or more pairs of wheels rest on uneven ground areas, and the torsional stress transmitted by the wheels to the vehicle frame is further transmitted to the body in a manner that tends to strain and damage the vehicle body.

In addition, the torsional stress reduces the amount of traction between a wheel or wheels of the vehicle and the ground by a twisting action which tends to lift a wheel partially or entirely off the ground, or, in the alternative, which prevents the wheel from dropping into full contact with the ground. These factors build into the vehicle a great amount of vibration, which in turn causes physical fatigue to the driver and passengers and potential damage to the cargo. Furthermore, the weight of the load being transported is not being equally carried by each wheel, resulting in additional body stress. To overcome some of the torsional stress problems, this type of vehicle usually has a heavy, strong frame to absorb the torsional stress transmitted to the frame when the wheels traverse uneven ground. Nevertheless, the torsional stress is not eliminated.

The split frame, split body vehicle is constructed to provide a forward and rear body section imposed upon a hinged or articulated vehicle frame. There is a tendency in this type of vehicle for the front and rear bodies to jackknife when the brakes or power are applied to the wheels of the body section and not another. In addition, because of the split body, the cargo or passenger carrying capacity of the vehicle is smaller than a single body vehicle of similar dimensions.

SUMMARY

Our frame minimizes the foregoing problems. The frame includes a pair of spaced-apart independently rotatable frame arms which are adapted to be connected to a one-piece vehicle body. Each of the frame arms are rotatably secured to a central axle and are joined adjacent their forward and rearward ends by extendible connecting arms. Each of the connecting arms carries a universal joint for connecting the frame to the body, and each universal joint is maintained centered with respect to the frame by centering arms attached to the frame arms. As one of the wheels carried by one of the frame arms encounters an obstacle, the wheels of the other frame arm remain in contact with the ground, and the load carried by the frame is substantially equally supported by all of the wheels.

DESCRIPTION OF THE DRAWINGS

Our invention is explained in conjunction with the illustrative embodiment shown in the accompanying drawing, in which—

FIG. 1 is a plan view of a vehicle frame embodying our invention;

FIG. 2 is an enlarged fragmentary view of a portion of FIG. 1 showing one of the connecting arms;

FIG. 3 is a perspective view of the connecting arm of FIG. 2;

FIG. 8 is a plan view of a frame provided with eight wheels;

FIG. 9 is a plan view of another embodiment of a frame provided with eight wheels; and FIG. 10 is a plan view of a vehicle provided with twelve wheels.

DESCRIPTION OF SPECIFIC EMBODIMENT

Figure 4:
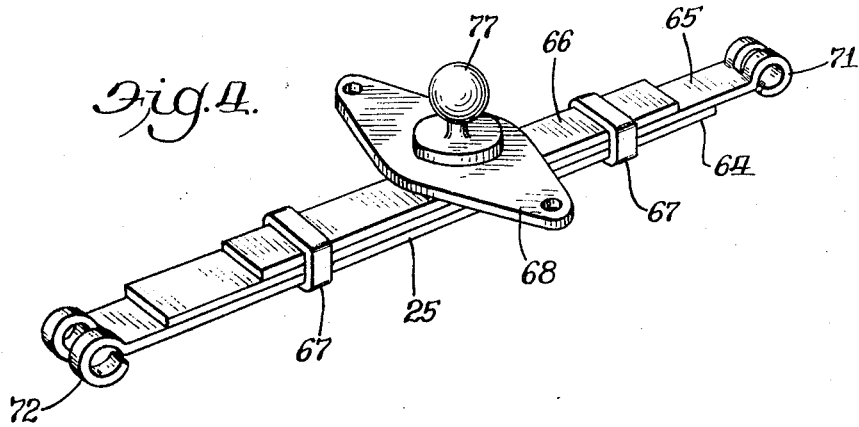
FIG. 4 is a perspective view of the other connecting arm.

Referring to FIG. 1 a vehicle frame designated generally by the numeral 20 includes right and left frame arms 21 and 22, respectively, which may be channel-shaped in cross section. A central axle housing 23 extends transversely between the frame arms, and each frame arm is independently rotatable about the central axle. The central axle housing extends through an opening provided at about the midpoint of each frame arm to provide forward portions 21a and 22a and rearward portions 21b and 22b for each frame arm. A portion of frame arm 22 is broken away to show opening 23c in the web portion of the channel. Front and rear connecting arms 24 and 25, respectively, join the frame arms adjacent the front and rear ends thereof, and we have found that the connecting arms are preferably positioned at about ⅔ the distance between the central axle housing and the ends of the frame arms. Frame arm 21 rotatably supports front and rear wheels 26 and 27, respectively, and frame arm 22 rotatably carries front and rear wheels 28 and 29, respectively.

Steering of the frame may be accomplished by attaching the front wheels 26 and 28 to their respective frame arms by a conventional Jeep-type universal axle connection as described in greater detail in our prior co-pending application entitled "Six-Wheeled Vehicle With Independent Wheel Suspension," Ser. No. 766,511, filed Oct. 10, 1968, and, if desired, the rear wheels may also be connected by universal axle connections.

A central axle 30 is rotatably carried within the central axle housing, and a pair of right hand sprockets 31 and 32 and a pair of left hand sprockets 33 and 34 are secured to the central axle and extend radially outwardly from the central axle within enlarged sprocket housing portions 35 of the central axle housing. Each wheel is attached to its respective frame arm by a stub axle housing 36 which rotatably carries a stub axle 37 and a sprocket 38 is secured to the inner end of each stub axle. Each of the sprockets 38 are operatively connected to one of the sprockets 31–34 by chains 39, and a suitable drive means is operatively connected to the central axle 30 for rotating the wheels. A more detailed description of the central axle and the chain-and-sprocket connections may be found in our said co-pending prior application. If desired, the frame may be provided with only two-wheel drive by eliminating either the front or rear chain-and-sprocket connections.

Referring now to FIGS. 2 and 3, the front connecting arm 24 is composed of three automotive type spring leafs or bars 40, 41, and 42 which are held together by bands 43. Each of the bands 43 is suitably secured to the top leaf 42 as by welding, and the bands 43 are sized to secure the spring leafs while permitting relative sliding movement therebetween. The bottom leaf 40 is provided with a bifurcated looped end 44, and the middle leaf is provided with a bifurcated looped end 45. A centering arm 46 is rotatably secured to the top leaf spring 42 by bolt or rivet 47, and when the frame rests on level terrain, the centering arm 46 is inclined somewhat from the perpendicular with respect to the connecting arm 24 as shown in FIG. 2.

Each of the frame arms 21 and 22 includes an inwardly extending eye bracket 48 and 49, respectively, which is received between the bifurcated halves of one end of one of the spring leafs. The bifurcated end 44 of the bottom spring leaf is attached to the eye bracket 49 by bolt 50 which is surrounded by a rubber sleeve 51. Similarly, the bifurcated end 45 is secured to the eye bracket 48 by bolt 52 which is surrounded by a rubber sleeve 53.

Each of the bolts 50 and 52 are provided with a ball fitting 54 and 55, respectively, at one end thereof, and each of the ball fittings are received by a ball socket provided in one of the centering tie rods 56 and 57. The centering tie rod 56 includes a central rod portion 56a and a cylindrical fitting 56b threadedly secured on the outer end of the rod 56a which provides the ball joint socket for the ball fitting 54. The inner end of the rod portion 56a is bent downwardly as at 56c and is received by an opening 58 provided in one end of the centering arm 46. If desired, washers 59 may be received on the bolt 50 between the connecting arm 24 and the tie rod 56 and between the connecting arm and the nut 60 which threadedly engages the bolt. Similarly, the bolt 52 may receive washers 61 and nut 62.

Centering tie rod 57 similarly includes a rod portion 57a and a cylindrical end portion 57b, and the hooked end 57c of the rod portion is received in an opening 63 in the other end of the centering arm.

Referring to FIG. 4, the rear connecting arm 25 is similar to the front connecting arm and includes bottom leaf spring 64, middle leaf spring 65, and a top leaf spring 66, all of which are held together by bands 67 which are secured to the top leaf spring and which permit relative sliding movement of the leaf springs. Centering arm 68 is rotatably secured to the top bar 66.

Referring to FIG. 1, the rear connecting arm 25 is secured to eye brackets 69 and 70 which extend inwardly from the frame arms 21 and 22, respectively, in the manner described with respect to the front connecting arm 24. The bifurcated looped ends 71 and 72 of the middle and bottom leaf springs 65 and 64, respectively, are secured to the eye brackets 69 and 70 by bolts 73 and 74 similar to the bolts 51 and 52 which secure the front connecting arm. The ball fitting of the bolt 73 is received by the ball joint opening provided in the connecting tie rod 75 and the ball fitting of the bole 74 is received by the ball joint opening of the connecting tie rod 76. Each of the tie rods 75 and 76 is provided with hooked ends which are received in openings on opposite ends of the centering arm 68.

Means for connecting the frame to a vehicle body are carried by each of the connecting arms 24 and 25. Referring to FIG. 4, a ball joint 77 is attached to the centering arm 68 of the rear connecting arm 25 and the ball joint 77 is adapted to be received by a correspondingly shaped socket carried by the vehicle body desired to be attached to the frame. For example, referring to FIG. 5, the ball joint 77 is received by a socket provided in a generally U-shaped yoke or body support 78, which extends downwardly from the body B above the frame. The body B is preferably of the one-piece type and may include a platform 79 for carrying passengers, cargo, or the like, and the platform 79 is supported by spaced-apart tubular reinforcing bars 80 which extend longitudinally of the body. If desired, the front and rear ends of the reinforcing bars 80 may be joined to provide a generally rectangularly shaped integral reinforcing bar. The attaching yoke 78 is secured to the reinforcing bar 80 and extends downwardly toward the rear connecting arm.

Referring to FIGS. 2 and 3, the front connecting arm 24 is connected to the body by means of a standard universal joint 81 which is secured to the centering arm 46 by spaced-apart upwardly extending ears 82. A generally channel-shaped slide receptacle 83 is welded to the top of the universal joint 81 so that it may rotate about axes both longitudinal and transverse with respect to the frame. The slide receptacle 83 slidably receives plate 84 which is welded to a yoke which extends downwardly from the forward portion of the body B and which is similar to the yoke 78. The plate 84 may slide relative to the slide receptacle 83 but is retained therein by inwardly extending flanges 85 which overlap the plate 84.

Thus, the front of the body is connected to the frame by means of the universal joint and slide receptacle 83, and the body may slide transversely with respect to the front connecting arm 24. The rear of the body, however, always remains fixed longitudinally with respect to the rear centering arm 25 by virtue of the ball joint coupling therebetween. If desired, the ball joint coupling and the sliding universal coupling provided by the universal 81 and slide receptacle 83 may be reversed. That is, the sliding universal coupling may be attached to the rear connecting arm, and the ball joint may be attached to the front connecting arm.

Figure 5:
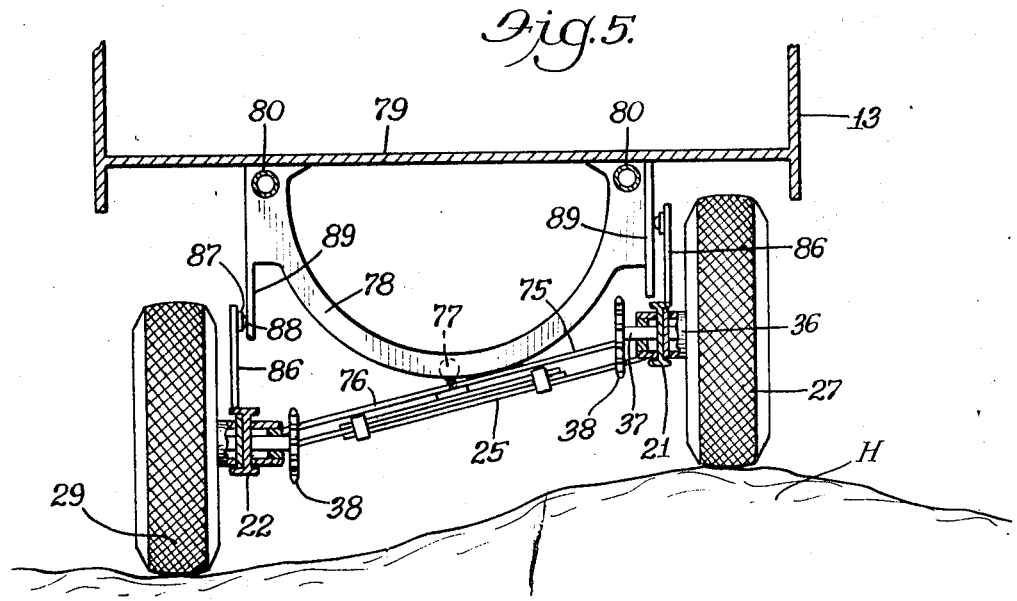
FIG. 5 is an end view of a vehicle provided with the frame illustrated in FIG. 1 traversing a hump.

As can be seen best in FIGS. 1 and 5, an upwardly extending body post 86 is secured to each of the frame arms 21 and 22 adjacent each of the front and rear connecting arms 24 and 25. The upper end of each body post carries a bearing housing 87 which rotatably holds a ball bearing 88, and the bearings 88 engage side walls 89 which are secured to the reinforcing bars 79 and extend between the front and rear yokes 78. The body posts slidingly engage the side walls 89 and substantially prevent the body from rotating about its longitudinal axis while permitting vertical movement of the frame with respect to the body.

Alternative embodiments of our invention are illustrated in FIGS. 8-10. The frame 120 illustrated in FIG. 8 carries a total of eight wheels, with each end of each of the frame arms 121 and 122 carrying a pair of wheels. The frame arms are rotatable about the central axle housing 123 and are connected by extendible connecting arms 124 and 125 similar to the arms 24 and 25 previously described. Each end of each of the frame arms 121 and 122 carries a stub shaft 126, which rotatably supports a connecting plate 127. A pair of stub axles 128 and 129 extend outwardly from the forward and rearward ends of the connecting plates 127, and each axle carries a wheel 130.

The frame 220 illustrated in FIG. 9 is also provided with eight wheels, but four of the wheels are carried by the central axle 223a carried within central axle housing 223. A single wheel 226 is carried by each end of each frame arm 221 and 222, and each end of the central axle 223a rotatably supports a connecting plate 227. Forward and rearward stub axles 228 and 229 extend outwardly from each end of the connecting plates 227 and carry wheels 230. The frame arms are similarly joined by extendible connecting arms 224 and 225.

If desired, each of the frame arms 221 and 222 may be formed of independent arm portions which extend forwardly and rearwardly from the central axle and which are independently rotatable thereabout. Thus, the forwardly extending portion of the frame arm 221 could rotate about the central axle 223 independently of the rearwardly extending portion of the frame arm 221 similar to the frame arms illustrated in our said co-pending prior application.

The frame 320 illustrated in FIG. 10 carries twelve wheels, a pair of wheels being supported by each end of each of the frame arms 321 and 322 and a pair of wheels being carried by each end of the central axle 323. The frame arms 321 and 322 are similarly connected by front and rear extendible frame arms 324 and 325. Each end of the frame arms rotatably supports a connecting plate 326, and each connecting plate carries a pair of wheels 327. Similarly, each end of the central axle 323 rotatably carries a connecting plate 328, and each connecting plate 328 carries a pair of wheels 329. If desired, the frame arms 321 and 322 may also be formed of independently rotatable forward and rearward portions.

OPERATION

Figures 6, 7:
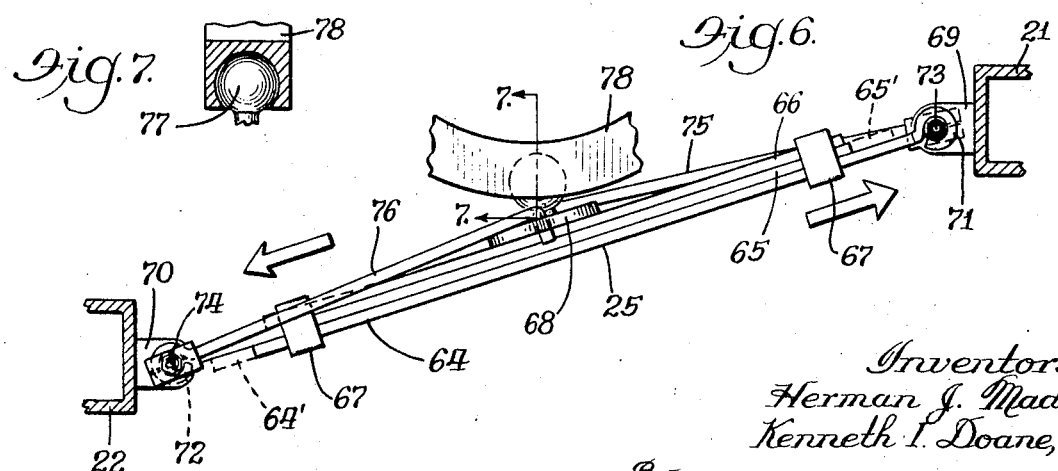
FIG. 6 is an enlarged fragmentary view of a portion of FIG. 5.
FIG. 7 is a fragmentary sectional view taken along the line 7—7 of FIG. 6.

When the vehicle is traversing level terrain, the frame arms 21 and 22 are substantially parallel, and the body is supported in a horizontal position at both the front and the rear by both the front and rear connecting arms 24 and 25. When any of the wheels encounter an obstacle or an incline, that wheel is allowed to independently rise to follow the contour of the obstacle without transmitting torsional stress to the remainder of the frame or to the body. For example, FIG. 5 illustrates the vehicle with the rear right hand wheel 27 traveling over the hump H. When the rear wheel encounters the hump, the frame arm 21 rotates upwardly about the front axle which is supported by front wheel 26. As the frame arm 21 rotates upwardly, the distance between the rear portion of the frame arm 21 and the rear portion of the frame arm 22 increases, and the spring leafs 64 and 65 slide with respect to each other to accommodate the increased distance between the frame arms. As can be seen in FIGS. 6, the spring leafs 64 and 65 have moved from their original positions illustrated in phantom at 64' and 65', respectively, to the positions illustrated in solid. However, the ball fitting 77 carried by the rear centering arm 68 is always maintained centrally of the frame arms 21 and 22 as the rear connecting arm extends by the centering arms 75 and 76. Referring to FIG. 1, as the frame arm 21 moves upwardly and the connecting arm 25 extends, the centering arm 68 will be rotated clockwise by the centering rods, and the ball fitting 77 will be maintained in the center of the frame. The ball fitting 77 rotates within its associated cup fitting carried by the rear yoke 78 as the rear connecting arm 25 becomes inclined with respect to the horizontal (FIGS. 5 and 6), and no torsional stress is transmitted to the body.

While the frame arm 21 rotates upwardly, the eye bracket 69 thereon tends to move forwardly with respect to the eye bracket 70 on the frame arm 22, and the rear connecting arm 25 twists slightly with respect to the frame arms. However, the twisting of the connecting arm is accommodated by the rubber sleeves carried by the connecting bolts 73 and 74, and stress is not transmitted from one frame arm to the other.

With the rear right hand wheel 27 in the position illustrated in FIG. 5, the rear of the body has been lifted somewhat from its original position by the raising of the rear connecting arm 25. However, rotation of the body about its longitudinal axis is substantially prevented by the body support posts 86, and the body is permitted to tilt from back to front by virtue of the universal joint connections between the front and rear of the body and the front and rear connecting arms. As the rear of the body is lifted, the channel slide 83 secured to the front centering arm 46 (FIG. 3) rotates about the axis of the universal joint which extends transversely of the body, and the plate 84 secured to the front body yoke slides somewhat forwardly within the channel slide to accommodate the decreased distance between the front and rear centering arms 24 and 25 as the rear of the body is raised.

Similarly, when one of the front wheels 26 and 28 encounters an obstacle, the associated frame arm will rotate about the rear wheel, and the front connecting arm 24 will extend to accommodate the increased distance between the two front frame arms. However, even though the front connecting arm extends, the universal joint 81 is maintained centrally of the frame arms by the centering arm 46 and the centering tie rods 56 and 57. The front connecting arm is freely permitted to become inclined with respect to the horizontal without transmitting stress to the body by virtue of the universal joint 81 which secures the front connecting arm to the front of the body, and the body is permitted to slide along its longitudinal axis with respect to the front connecting arm to accommodate the change in distance between the front and rear centering arms as one or both of the front frame arms is raised.

Thus, no matter whether one or more of the wheels are lifted with respect to the others, no torsional stress is created in the frame or transmitted to the body. The body is connected to the frame at only two points, and the centering arms maintain the frame and the body centered at all times. Only one point on the frame, the ball fitting 77, is maintained in a fixed longitudinal position with respect to the body, and the ball fitting may rotate freely with respect to the body to permit rotation of the rear connecting arm about the longitudinal and transverse axes. Even though the body is connected to the frame at only two points, the body is substantially prevented from rotating about its longitudinal axis by the four body support posts 86. Rotation of the body about its transverse axis is permitted by virtue of the universal joint 80 and channel slide 83.

The frame 120, 220, and 320 illustrated in FIGS. 8-10 are similarly constructed and operate in the same way.

Although we have shown the extendible connecting arms to be comprised of relatively flat superimposed bars, it will be understood that other forms of connecting arm means may be used. For example, the connecting arms may be formed of telescoping tubes, or the like.

While in the foregoing specification we have set forth a detailed description of a specific embodiment of our invention for the purpose of explanation, it is to be under-

We claim:

1. A vehicle frame for supporting a vehicle body, said frame comprising a pair of elongated spaced-apart frame arms, a central axle extending generally transversely between said frame arms at approximately the midpoints thereof to provide a forwardly extending portion and a rearwardly extending portion for each frame arm, each frame arm being rotatably secured to the central axle, a wheel carried by each frame arm adjacent each of the forward and rearward ends thereof, forward connecting arm means extending generally transversely between the forward portions of the frame arms and secured thereto, rearward connecting arm means extending generally transversely between the rearward portions of the frame arms and secured thereto, each of the connecting arm means being extendible to permit the distance between the frame arms to vary as one frame arm rotates about the central axle with respect to the other frame arm, attaching means carried by each of the connecting arm means adapted for attaching the frame to a vehicle body, and centering means carried by said frame arms for maintaining each of the attaching means substantially centered transversely between the frame arms.

2. The vehicle frame of claim 1 wherein each of said connecting arm means includes a pair of bars joined for relative sliding movement therebetween, each bar of each pair being connected to one of the frame arms.

3. The vehicle frame of claim 2 wherein each of the centering means includes a centering arm rotatably and slidably mounted on one of said bar pairs and a pair of centering rods, each of the centering rods being secured to one of the frame arms and to one end of the centering arm.

4. The vehicle frame of claim 1 wherein each of said connecting arm means includes a first bar attached to one of the frame arms, a second bar attached to the other frame arm, and a third bar, said bars being joined for relative sliding movement therebetween, centering rod means attached to each of the frame arms and to the third bar for maintaining the third bar generally centered between the frame arms as the first and second bars slide with respect to each other, said attaching means being secured to said third bar.

5. The vehicle frame of claim 4 wherein each of said centering rod means includes an elongated centering arm and a pair of centering rods, the middle of the centering arm being rotatably secured to the associated third bar, each of the centering rods being secured to one of the frame arms and one end of the centering arm.

6. The structure of claim 1 in which one of said attaching means includes a ball fitting adapted to be received by a socket provided in the body to provide a ball-and-socket connection between the body and the frame and the other attaching means includes a universal joint and slide means, said slide means adapted to permit front-to-rear movement of the connecting arm means carrying said other attaching means with respect to the vehicle body.

7. The structure of claim 1 including a body support post extending upwardly from each of the forwardly and rearwardly extending portions of each frame arm, and adapted to slidingly engage the vehicle body to restrain rotation of the body.

References Cited

UNITED STATES PATENTS

| | | | |
|---|---|---|---|
| 2,710,199 | 6/1955 | Nickles | 280—104 |
| 3,001,798 | 9/1961 | Logan | 230—104 |

FOREIGN PATENTS 321,146    5/1920    Germany.

A. HARRY LEVY, Primary Examiner

U.S. Cl. X.R.

180—22, 41; 280—111, 80, 6